United States Patent
Berdoyes et al.

(10) Patent No.: US 6,948,307 B2
(45) Date of Patent: Sep. 27, 2005

(54) ROCKET ENGINE NOZZLE THAT IS STEERABLE BY MEANS OF A MOVING DIVERGING PORTION ON A CARDAN MOUNT

(75) Inventors: Michel Berdoyes, Cestas (FR); André Dumortier, Merignac (FR); Philippe Biz, St Medard en Jalles (FR); Antoine Hervio, St Aubin de Medoc (FR)

(73) Assignee: SNECMA Propulsion Solide, Le Haillan (FR)

( * ) Notice: Subject to any disclaimer, the term of this patent is extended or adjusted under 35 U.S.C. 154(b) by 0 days.

(21) Appl. No.: 10/500,248

(22) PCT Filed: Jul. 3, 2003

(86) PCT No.: PCT/FR03/02067

§ 371 (c)(1),
(2), (4) Date: Jun. 25, 2004

(87) PCT Pub. No.: WO2004/005690

PCT Pub. Date: Jan. 15, 2004

(65) Prior Publication Data

US 2005/0016158 A1 Jan. 27, 2005

(30) Foreign Application Priority Data

Jul. 4, 2002 (FR) .......................................... 02 08370

(51) Int. Cl.⁷ ................................................ F02K 1/00
(52) U.S. Cl. ......................... 60/232; 60/228; 60/200.1
(58) Field of Search .......................... 60/201, 228, 232, 60/770, 230; 239/265.19, 265.33, 265.35, 265.37, 587.1

(56) References Cited

U.S. PATENT DOCUMENTS

| 3,032,982 | A | * | 5/1962 | Gaubatz ................ 239/265.35 |
|---|---|---|---|---|
| 3,090,198 | A | * | 5/1963 | Zeisloft .................. 239/265.35 |
| 3,140,584 | A | * | 7/1964 | Ritchey et al. ................ 60/232 |
| 3,142,153 | A | | 7/1964 | Hensley |
| 3,237,890 | A | | 3/1966 | Thielman |
| 3,302,885 | A | * | 2/1967 | Herbert .................. 239/265.19 |
| 3,390,899 | A | * | 7/1968 | Herbert et al. ................ 285/45 |
| 3,392,918 | A | * | 7/1968 | Lloyd ..................... 239/265.35 |
| 3,401,887 | A | * | 9/1968 | Sheppard ............... 239/265.35 |
| 3,436,021 | A | * | 4/1969 | Walton et al. ......... 239/265.35 |
| 3,570,768 | A | * | 3/1971 | Conway et al. ........ 239/265.35 |
| 3,811,713 | A | * | 5/1974 | Barrett et al. ............... 285/226 |
| 4,350,297 | A | | 9/1982 | Martin |

FOREIGN PATENT DOCUMENTS

DE         31 19 183       12/1982

* cited by examiner

Primary Examiner—William H. Rodriquez
(74) Attorney, Agent, or Firm—Weingarten, Schurgin, Gagnebin & Lebovici LLP

(57) ABSTRACT

The nozzle comprises a moving diverging portion (20) and a static portion (16) secured to the rear end wall of the combustion chamber (12) of the engine. A cardan mount jointed link device connects the moving diverging portion of the nozzle to the static portion, the moving diverging portion and the static portion being in mutual contact via respective spherical surfaces (24a, 16a), and an actuator device (50a, 50b) acts on the moving diverging portion of the nozzle so as to be able to vary the direction of the thrust vector of the engine by modifying the orientation of the nozzle with sliding of the spherical surfaces one on the other. Resilient return means (62, 64) are interposed between the moving diverging portion (20) of the nozzle and the static portion (16) and act on the moving diverging portion in order to urge it towards the static portion so as to keep the spherical surfaces (24a, 16a) in mutual contact for any desired orientation of the nozzle.

13 Claims, 3 Drawing Sheets

ROCKET ENGINE NOZZLE THAT IS STEERABLE BY MEANS OF A MOVING DIVERGING PORTION ON A CARDAN MOUNT

This application is a 371 national phase filing of PCT/FR2003/002067 file Jul. 3, 2003, and claims priority to a French application No. 02/08370 filed Jul. 4, 2002.

BACKGROUND OF THE INVENTION

The invention relates to steerable nozzles for rocket engines.

The field of application of the invention is more particularly but not exclusively that of missiles, in particular tactical missiles having a diameter of less than about 500 millimeters (mm).

A steerable-nozzle rocket engine comprises a casing defining a combustion chamber that opens out through a rear end wall, at least one nozzle comprising a moving diverging portion and a static portion, a jointed link device connecting the moving diverging portion and the static portion, and an actuator device acting on the nozzle to change its orientation, and consequently to change the direction of the thrust vector produced by combustion gas being ejected from the chamber.

A known jointed link device uses a laminated spherical abutment made up of a stack of metal or composite material layers alternating with layers of resilient material bonded to one another. Such a device enables the nozzle to swivel to a limited extent relative to the casing by deformation of the resilient layers in shear. The laminated abutment is mounted so that it is normally stressed in compression under the effect of the force exerted by the combustion gas on the nozzle, given its limited strength against tension forces. Unfortunately, in certain configurations, the laminated abutment can be subjected to tension forces. In addition, laminated abutments are sensitive to aging and it is difficult to make laminated abutments that are capable of withstanding a very wide range of temperatures.

In order to overcome the above drawbacks, proposals have been made for a nozzle with a steerable diverging portion that presents a spherical surface in direct contact with a complementary spherical surface formed on the static portion of the nozzle (ball and socket system), a change in the orientation of the diverging portion of the nozzle being accompanied by the spherical surfaces sliding one over the other. The portions of the moving diverging portion and of the static portion of the nozzle that are in mutual contact are typically made of a carbon/carbon (C/C) composite material which presents good thermo-mechanical behavior, in particular at high temperature, and high resistance to ablation. Such a mount avoids the drawbacks of mounts having laminated spherical abutments, but the problem to be solved is that of providing gas-tightness between the contacting spherical surfaces for all orientations of the diverging portion of the nozzle. To achieve this, it is necessary to provide permanent contact between the ball and the socket regardless of the angle of activation. Preliminary tests have been performed with such a steerable nozzle. Those tests have shown that the concept is viable but with limitations on control in the pitch and yaw planes, with the ball being pressed against the socket by prestressed actuators.

OBJECT AND SUMMARY OF THE INVENTION

An object of the invention is to provide a steerable nozzle for a rocket engine that does not present the drawbacks of the state of the art using a connection via the above-mentioned laminated spherical abutment, and in particular to propose a jointed mount that is robust and reliable, while also providing gas-tightness at the contacting surfaces for any desired orientation of the nozzle.

This object is achieved by a steerable nozzle for a rocket engine comprising: a casing surrounding a combustion chamber and having a rear end wall; a nozzle comprising a moving diverging portion and a static portion secured to the rear end wall; a jointed link device connecting the moving diverging portion of the nozzle to the static portion, the moving diverging portion and the static portion being in mutual contact via respective spherical surfaces; and an actuator device acting on the moving diverging portion of the nozzle to enable the direction of the thrust vector of the engine to be varied by modifying the orientation of the nozzle with the spherical surfaces sliding one on the other, which steerable nozzle further comprises, in accordance with the invention, resilient return means interposed between the moving diverging portion of the nozzle and the static portion, said means acting on the moving diverging portion to urge it towards the static portion so as to keep the spherical surfaces in mutual contact for any desired orientation of the nozzle.

By means of the resilient return force that is exerted, a relatively stable force pressing the spherical surfaces against each other can be ensured regardless of the displacements performed during operation, thus enabling actuation to take place in any direction without affecting the gas-tightness between these spherical surfaces.

The link device may be of the cardan mount type comprising a ring, two first link arms connecting the moving diverging portion of the nozzle to the ring via two first hinges, and two second link arms connecting the static portion of the nozzle to the ring via two second hinges.

The resilient return means may be integrated in the first link arms. They may be constituted by prestressed springs.

In another embodiment, the resilient return means are constituted at least in part by an elastically deformable part of the link device, e.g. the ring of the cardan mount, which is deformed elastically on assembly.

Anti-friction means may be present between the mutually contacting spherical surfaces. The anti-friction means may be constituted by a lubricant, e.g. graphite grease. In a variant, the anti-friction means may be constituted by a coating or an interface part which is disposed in the contact zone between the spherical surfaces, e.g. a coating of material having a low coefficient of friction and formed on one of the surfaces or on both of them.

The actuator device may be conventionally constituted by linear actuators or cylinders. In a variant, when the link device is a cardan mount having two pivot axes, the actuator device comprises rotary actuators positioned on the cardan mount axes for the purpose of controlling them directly.

Compared with prior art devices using a laminated spherical abutment, the steerable nozzle assembly of the present invention presents significant advantages:

it is more robust in the face of environmental conditions and aging;

it enables large thrust-deflection angles to be obtained by using larger spherical contact areas, which combines with the phenomenon of amplified thrust deflection that is inherent to devices having a moving diverging portion and that is due to aerodynamic effects internal to the nozzle;

it is less sensitive to reentrant force phenomena, i.e. acting on the moving diverging portion towards the upstream end thereof, where such forces can damage laminated abutments and are taken up by the contacting spherical surfaces in the nozzle of the invention; and it makes it possible to avoid not only a laminated spherical abutment, which is a component that is relatively expensive, but also to omit the thermal protection that needs to be associated therewith.

BRIEF DESCRIPTION OF THE DRAWINGS

The invention will be better understood on reading the following description made with reference to the accompanying drawings, in which.

DETAILED DESCRIPTION OF AN EMBODIMENT

Figure 1:
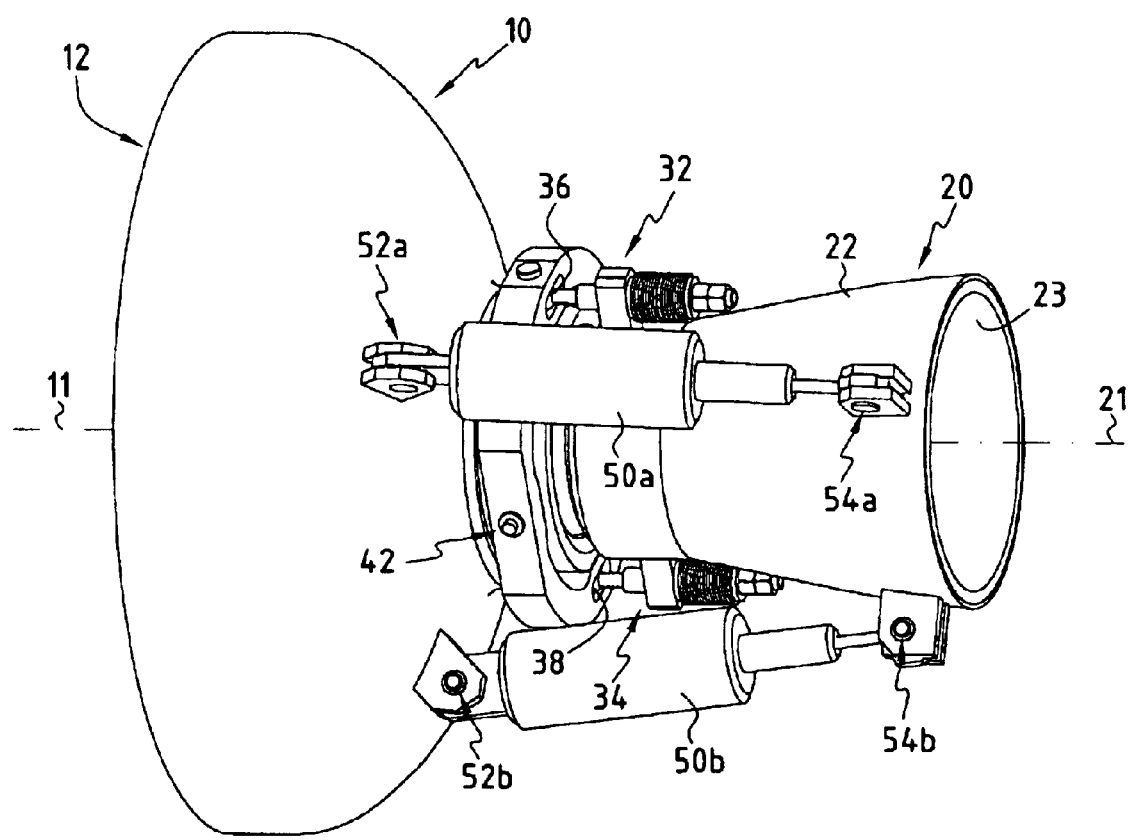
FIG. 1 is a fragmentary and diagrammatic perspective view of a rocket engine in accordance with the invention.
Figure 2:
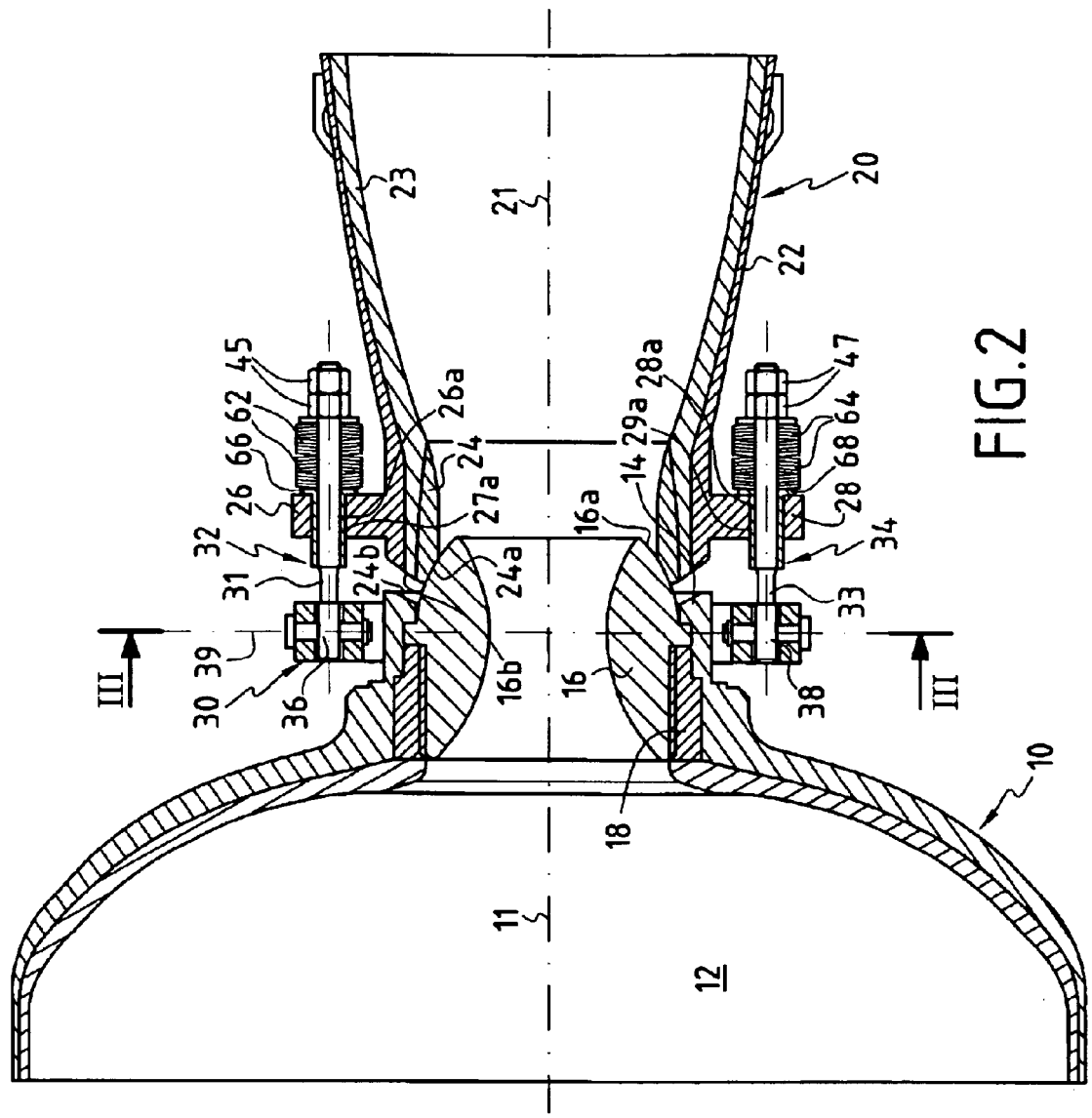
FIG. 2 is a fragmentary longitudinal section view of the FIG. 1 rocket engine.
Figure 3:
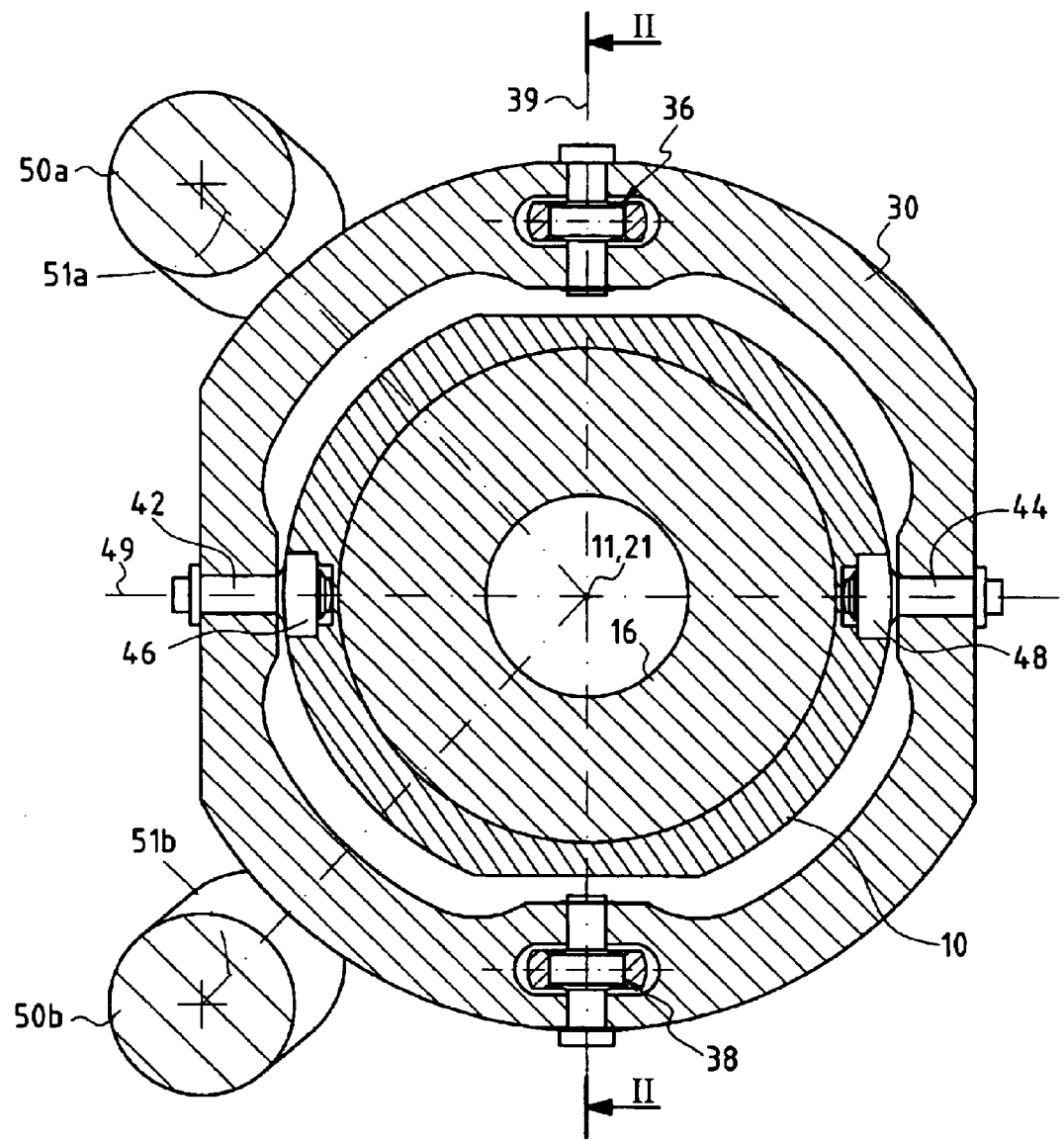
FIG. 3 is a cross-section view on plane III—III of FIG. 2.

FIGS. 1 to 3 are diagrams showing a rocket engine having a casing 10 surrounding a combustion chamber 12 in which there is received a block of solid propellant (not shown). The chamber 12 opens out through its rear end wall 14 into the front of a nozzle that comprises a throat part 16 and a diverging portion 20.

The throat part 16 defines not only the nozzle throat proper, but also the converging portion and the beginning of the diverging portion, and it is fastened, e.g. by being screwed into a ring 18 that is fixed to the end wall 14 of the casing, so as to be secured to the end wall 14.

The throat part 16 is typically made of C/C composite material, and the ring 18 is typically made of insulating composite material. Thermal protection layers are provided on the inside face of the casing. Such a combustion chamber structure is well known in itself.

The diverging portion 20 of the nozzle (or at least a fraction thereof) is movable, being mounted on a static portion of the nozzle, and specifically the part 16. As is also known, making a steerable nozzle by means of a moving diverging portion is advantageous in that it makes it possible to amplify thrust deflection relative to the actual pivot angle of the main axis of the diverging portion.

The moving diverging portion 20 typically comprises a casing 22, e.g. made of metal, having an inside layer 23 of ablative insulating material, e.g. made of a composite of carbon or silica reinforcing fibers with a matrix of phenolic resin. At its upstream end, the moving diverging portion 20 has a part 24 in the form of an internal ring that is typically made of C/C composite material.

The throat part 16 and the moving diverging part 24 are in mutual contact via respective spherical surfaces 16a and 24a centered on the axis 11 of the nozzle.

It should be observed that the parts 22, 24, and 23 of the moving diverging portion may be united to form a single part of composite material.

The moving diverging portion of the nozzle is connected to the static portion thereof via a cardan mount type mechanical link comprising a ring 30, e.g. made of metal, disposed around the end wall of the casing, two link arms 32 and 34 secured to the casing 22 of the moving diverging portion of the nozzle and connected at their ends to the ring via two respective hinges 36 and 38, and two other link arms 42 and 44 secured to the ring 30 and connected at their ends to the end wall 14 of the casing 10 of the combustion chamber, and consequently to the static portion of the nozzle, via two other respective hinges 46, 48.

The arms 32, 32 and the hinges 36, 38 are disposed in locations that are opposite about the axis 11, the axes of the hinges 36, 38 defining a pivot axis 39 situated in a plane perpendicular to the axis 11.

Similarly, the arms 42, 44 and the hinges 46, 48 are disposed in locations that are opposite about the axis 21 of the combustion chamber, the axes of the hinges 46, 48 defining a pivot axis 49 situated in a plane perpendicular to the axis 21. The hinges 36, 38, 46, 48 are angularly spaced apart in regular manner around the ring 30 so that the pivot axes 39 and 49 are orthogonal.

Abutment surfaces 16b, 24b of the parts 16 and 24 limit the amount of angular displacement that is possible between the axis 11 and the axis 21.

The nozzle can be actuated either by a plurality of linear actuators or cylinders having one end bearing against the casing 22 of the diverging portion 20 of the nozzle and an opposite end bearing against the casing 10 of the combustion chamber, or by a plurality of rotary actuators positioned at the cardan mount on the axes 39 and 49 so as to steer the two pivot axes of the cardan mount directly.

In the example shown, only two linear actuators 50a and 50b are provided, being connected to the casings 10 and 22 via hinges 52a, 52b and 54a, 54b, and the meridian planes containing the axes 51a and 51b of the actuators 50a and 50b form between them an angle that is equal to about 90°.

In a variant, it should be observed that the actuators can be mounted between the ring 30 and the moving diverging portion 20 of the nozzle. It should also be observed that the number of actuators could be greater than two.

In accordance with the invention, resilient return means are provided which act on the moving diverging portion 20 of the nozzle in a direction opposite to that of the gas flow direction through the nozzle so as to keep the surfaces 16a and 24a permanently in mutual contact, regardless of the desired orientation for the diverging portion of the nozzle. As a result, gas-tightness between the surfaces 16a and 24a is conserved for any possible orientation of the axis 21 relative to the axis 11.

In the example shown, the resilient return means are constituted by springs 62, 64, e.g. of the Belleville washer type, that are prestressed in compression and that are received in the arms 32 and 34.

More precisely, each arm 32, 34 comprises a rod 31, 33 having one end connected to the joint 36, 38 and having its other end passing through a hole 26a, 28a in a lug 26, 28 secured to the casing 22 of the diverging portion of the nozzle.

This other end is held by means of a nut 45, 47 screwed onto the end of the rod, with the spring 62, 64 being interposed between the nut 45, 47 and the lug 26, 28. By way of example, the spring 62, 64 is housed in the enlarged end of a bushing 66, 68 engaged in the hole 26a, 28a.

The bushings 66, 68 are inserted into the holes 26a, 28a and they have the rods 31, 33 passing through them without clearance in order to eliminate, or at least reduce, the clearance between the rods 31, 33 and the holes 26a, 28a, and thus avoids any possible turning of the moving diverging portion about its axis 21.

The compression prestress of the springs 62, 64 is determined so as to guarantee effective return of the surfaces 16a, 24a against each other for any possible orientation of the diverging portion 20 of the nozzle.

During actuation of the steerable nozzle by acting on the actuators 50a, 50b, the contacting spherical surfaces 16a, 24a rub against each other. The friction between the parts 16, 24 can be dry friction. It is also possible to make use of anti-friction means such as a coating or an interface part present in the zone of contact between the ball and the socket on one or other of the two spherical surfaces constituting the ball and the socket, e.g. a material based on Teflon® or a lubricant, such as graphite grease penetrating at least in part into the residual pores of the part 16.

Means other than springs can be used for providing the resilient return needed for proper operation of the engine for every possible orientation of the nozzle. By way of example, return may be provided by an elastically deformable part of the link device connecting the moving diverging portion to the static portion of the nozzle, said part being elastically deformed on assembly.

Thus, in a variant of the embodiment of FIGS. 2 and 3, return is provided by elastic deformation of the ring 30 without making use of the springs 62 and 64. For this purpose, the ring 30, e.g. made of steel, is of a thickness or presents portions of reduced thickness that is/are determined so as to enable it to deform elastically under the effect of the nuts 45, 47 being tightened.

What is claimed is:

1. A steerable nozzle for a rocket engine comprising: a casing surrounding a combustion chamber and having a rear end wall; a nozzle comprising a moving diverging portion and a static portion secured to the rear end wall; a jointed link device connecting the moving diverging portion of the nozzle to the static portion, the moving diverging portion and the static portion being in mutual contact via respective spherical surfaces; an actuator device acting on the moving diverging portion of the nozzle to enable the direction of the thrust vector of the engine to be varied by modifying the orientation of the nozzle with the spherical surfaces eliding one on the other; and
    resilient return means interposed between the moving diverging portion of the nozzle and the static portion, said resilient return means acting on the moving diverging portion to urge it towards the static portion so as to keep the spherical surfaces in mutual contact for any desired orientation of the nozzle, to ensure gas tightness between the moving diverging portion and the static portion solely by the maintaining of the spherical surfaces in mutual contact for any desired orientation of the nozzle.

2. A nozzle according to claim 1, in which the link device is a cardan mount comprising a ring, two first link arms connecting the moving diverging portion of the nozzle to the ring via two first hinges, and two second link arms connecting the ring to the rear end wall of the casing via two second hinges wherein the resilient return means are integrated in link arms.

3. A nozzle according to claim 2, wherein the resilient return means are integrated in the first link arms.

4. A nozzle according to claim 1, wherein the resilient return means comprise prestressed springs.

5. A nozzle according to claim 1, wherein the resilient return means are constituted at least in part by an elastically deformable part of the link device which is elastically deformed on assembly.

6. A nozzle according to claim 2, wherein said resilient return means are constituted at least in part by said ring of the cardan mount which is elastically deformable and is elastically deformed on assembly.

7. A nozzle according to claim 1, wherein anti-friction means are provided between the spherical surfaces in mutual contact.

8. A nozzle according to claim 7, wherein the anti-friction means comprise a lubricant.

9. A nozzle according to claim 8, wherein the lubricant is a graphite grease.

10. A nozzle according to claim 7, wherein the anti-friction means comprise a coating or an interface part in the zone of contact between the spherical surfaces.

11. A nozzle according to claim 1, in which the link device is a cardan mount having two pivot axes, and the actuator device comprises rotary actuators positioned on the cardan axes in order to steer said axes directly.

12. A steerable nozzle for a rocket engine comprising:
    a casing surrounding a combustion chamber and having a rear end wall;
    a nozzle comprising a moving diverging portion arid a static portion secured to the rear end wall; a cardan mount connecting the moving diverging portion of the nozzle to the static portion, the moving diverging portion and the static portion being in mutual contact via respective spherical surfaces, the cardan mount comprising a ring, two first link arms connecting the moving diverging portion of the nozzle to the ring via two first hinges, and two second link arms connecting the ring to the rear end wall of the casing via two second hinges;
    an actuator device acting on the moving diverging portion of the nozzle to enable the direction of the thrust vector of the engine to be varied by modifying the orientation of the nozzle with the spherical surfaces sliding one on the other; and
    resilient return means integrated in link arms of said cardan mount and acting on the moving diverging portion to urge it towards the static portion so as to keep the spherical surfaces in mutual contact for any desired orientation of the nozzle, to ensure gas tightness between the moving diverging portion and the static portion solely by the maintaining of the spherical surfaces in mutual contact for any desired orientation of the nozzle.

13. A steerable nozzle for a rocket engine comprising:
    a casing surrounding a combustion chamber and having a rear end wall;
    a nozzle comprising a moving diverging portion and a static portion secured to the rear end wall;
    a cardan mount connecting the moving diverging portion of the nozzle to the static portion, the moving diverging portion and the static portion being in mutual contact via respective spherical surfaces; and
    an actuator device acting on the moving diverging portion of the nozzle to enable the direction of the thrust vector of the engine to be varied by modifying the orientation of the nozzle with the spherical surfaces sliding one on the other;
    the cardan mount comprising a ring, said ring of the cardan mount being elastically deformable on assembly to act on the moving diverging portion to urge it towards the static portion so as to keep the spherical surfaces in mutual contact for any desired orientation of the nozzle, to ensure gas tightness between the moving diverging portion and the static portion solely by the maintaining of the spherical surfaces in mutual contact for any desired orientation of the nozzle.

* * * * *

UNITED STATES PATENT AND TRADEMARK OFFICE
CERTIFICATE OF CORRECTION

| | | |
|---|---|---|
| PATENT NO. | : 6,948,307 B2 | Page 1 of 1 |
| APPLICATION NO. | : 10/500248 | |
| DATED | : September 27, 2005 | |
| INVENTOR(S) | : Michel Berdoyes | |

It is certified that error appears in the above-identified patent and that said Letters Patent is hereby corrected as shown below:

Column 5, claim 1, line 35, "eliding" should read --sliding--; and

Column 6, claim 12, line 16, "arid" should read --and--.

Signed and Sealed this

Nineteenth Day of June, 2007

JON W. DUDAS
*Director of the United States Patent and Trademark Office*